(12) United States Patent
Kitagawa et al.

(10) Patent No.: US 6,775,421 B2
(45) Date of Patent: Aug. 10, 2004

(54) METHOD AND APPARATUS OF IMAGE PROCESSING WHILE INPUTTING IMAGE DATA

(75) Inventors: Masahiko Kitagawa, Kusatsu (JP); Hiroki Nakano, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/791,448

(22) Filed: Feb. 23, 2001

(65) Prior Publication Data

US 2001/0033700 A1 Oct. 25, 2001

(30) Foreign Application Priority Data

Feb. 25, 2000 (JP) ........................................ 2000-049623

(51) Int. Cl.[7] ............................. G06K 9/20; G09G 5/36
(52) U.S. Cl. ...................... 382/282; 382/305; 345/558
(58) Field of Search ................................. 382/282, 173, 382/305, 307, 190, 203; 358/1.16, 1.18; 711/1, 100; 348/500, 513, 565; 345/530, 558, 547

(56) References Cited

U.S. PATENT DOCUMENTS

| 5,426,612 A | * | 6/1995 | Ichige et al. ................. 365/220 |
| 5,459,586 A | * | 10/1995 | Nagasato et al. ............ 358/450 |
| 6,097,853 A | * | 8/2000 | Gu et al. ..................... 382/282 |

FOREIGN PATENT DOCUMENTS

| JP | PUPA02-103680 | 4/1990 |
| JP | PUPA02-257293 | 10/1990 |

* cited by examiner

Primary Examiner—Kanji Patel
(74) Attorney, Agent, or Firm—Louis P Herzberg (57) ABSTRACT

An input image processing apparatus includes a FIFO memory (FIFO-S) in which region selection information for specifying a selected region in an input image frame, in order to consecutively store in an image memory pixel data within a selected region in an arbitrary shape defined on the image frame. The FIFO memory provides a signal for indicating write of pixel data included in the selected region into the image memory, based on the region selection information.

20 Claims, 14 Drawing Sheets

| PAT(0,0) | PAT(0,1) | PAT(0,2) | PAT(0,3) | PAT(0,4) | PAT(0,5) | PAT(0,6) | PAT(0,7) |
|---|---|---|---|---|---|---|---|
| PAT(1,0) | PAT(1,1) | PAT(1,2) | PAT(1,3) | PAT(1,4) | PAT(1,5) | PAT(1,6) | PAT(1,7) |
| PAT(2,0) | PAT(2,1) | PAT(2,2) | PAT(2,3) | PAT(2,4) | PAT(2,5) | PAT(2,6) | PAT(2,7) |
| PAT(3,0) | PAT(3,1) | PAT(3,2) | PAT(3,3) | PAT(3,4) | PAT(3,5) | PAT(3,6) | PAT(3,7) |
| PAT(4,0) | PAT(4,1) | PAT(4,2) | PAT(4,3) | PAT(4,4) | PAT(4,5) | PAT(4,6) | PAT(4,7) |
| PAT(5,0) | PAT(5,1) | PAT(5,2) | PAT(5,3) | PAT(5,4) | PAT(5,5) | PAT(5,6) | PAT(5,7) |

Fig. 2A

| 0 | 0 | 0 | 0 | 0 | 0 | 0 | 0 |
|---|---|---|---|---|---|---|---|
| 0 | 0 | 0 | 1 | 1 | 1 | 1 | 0 |
| 0 | 0 | 0 | 1 | 1 | 1 | 0 | 0 |
| 0 | 0 | 0 | 1 | 1 | 0 | 0 | 0 |
| 0 | 0 | 0 | 1 | 0 | 0 | 0 | 0 |
| 0 | 0 | 0 | 0 | 0 | 0 | 0 | 0 |

|          | RD_A | RD_B | RD_C | MP | WR |
|----------|------|------|------|----|----|
| PAT (3,0)  | 1 | 0 | 0 | A | 0 |
| PAT (3,1)  | 1 | 0 | 0 | A | 0 |
| PAT (3,2)  | 1 | 0 | 0 | A | 0 |
| PAT (3,3)  | 1 | 0 | 0 | A | 1 |
| PAT (3,4)  | 0 | 1 | 0 | B | 1 |
| PAT (3,5)  | 0 | 1 | 0 | B | 1 |
| PAT (3,6)  | 0 | 1 | 0 | B | 1 |
| PAT (3,7)  | 0 | 1 | 0 | B | 1 |
| PAT (3,8)  | 0 | 0 | 1 | C | 1 |
| PAT (3,9)  | 0 | 0 | 1 | C | 0 |
| PAT (3,10) | 0 | 0 | 1 | C | 0 |
| PAT (3,11) | 0 | 0 | 1 | C | 0 |

METHOD AND APPARATUS OF IMAGE PROCESSING WHILE INPUTTING IMAGE DATA

BACKGROUND OF THE INVENTION

1. Field of the Invention

The present invention relates to an input image processing apparatus and method. More particularly, it relates to an image processing apparatus for extracting only a selected image data portion from image data inputted from an image input device and processing method therefor.

2. Description of Related Art

Arithmetic processing is often performed on image data inputted from an image input device such as a Charge Coupled Device (CCD) using a Microprocessor (MPU). In many cases, the image data inputted takes the form of an image frame of predetermined size which is captured at a predetermined time interval from the CCD. In image processing, there are some cases that arithmetic processing is performed in the overall area of the image frame, and there are some cases that the processing is performed only in a selected portion of the image frame. When the processing is partially performed, a selected region is usually set on the image frame to extract only the image data portion within the selected region which is stored in an image memory for the partial processing.

Figure 11:
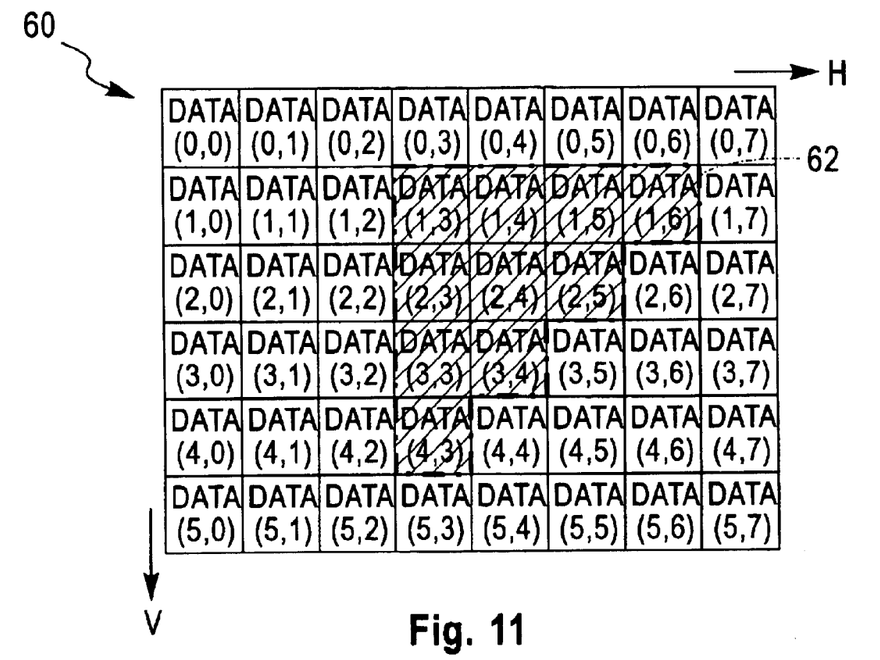
FIG. 11 shows an example of an image frame.

FIG. 11 shows an example of an image frame. In FIG. 11, an image frame 60 is assumed to be 8 pixels wide by 6 pixels high for simplification of explanation. DATA (h, v) (h=0 to 7, v=0 to 5) shown in FIG. 11 indicates pixel data. In the figure, h indicates a coordinate in the horizontal scanning direction H, assuming that the pixel on the top left is an origin, and v indicates a coordinate in a vertical scanning direction V. Pixel data is inputted for each line consisting of 8 pixels aligned in the horizontal scanning direction H from the top to bottom in order. Each line consisting of 8 pixels aligned in the horizontal scanning direction H is inputted from left to right in order.

Figure 12:
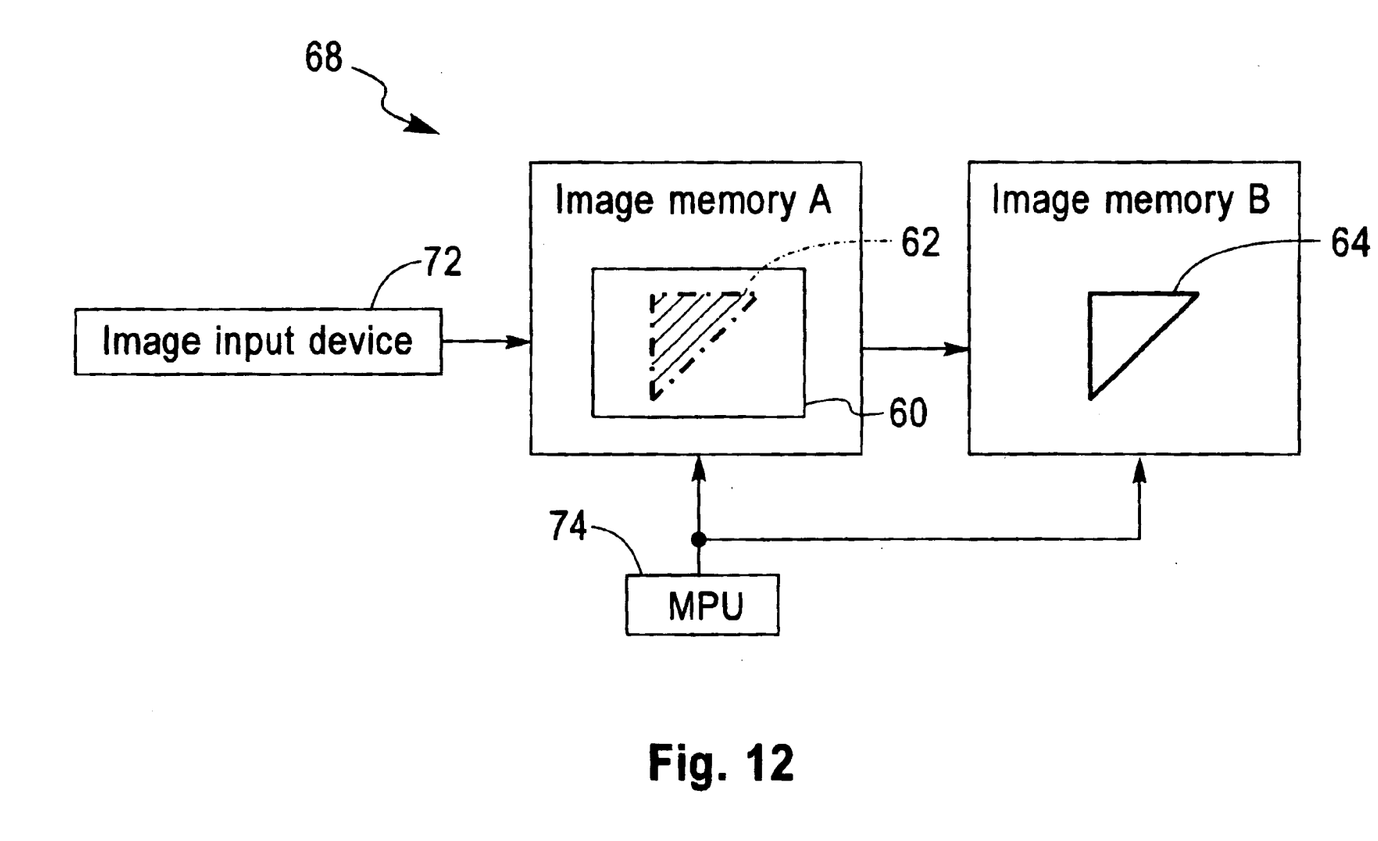
FIG. 12 shows an example of an input image processing apparatus in the prior art.

One of methods for fetching pixel data within a selected region 62 defined on the image frame 60 is shown in FIG. 12. An input image processing apparatus 68 shown in FIG. 12 includes two image memories (image memories A and B). The image frame 60 inputted from an image input device 72 is once captured in the image memory A. And then the selected region 62 is set on the image frame 60 within the image memory A to fetch image data portion 64 from the selected region 62 and store the data 64 in the image memory B.

Another method is to set up starting and ending coordinates respectively in the horizontal scanning direction H and the vertical scanning direction V of the image frame 60 and fetch image data from the area determined by its starting and ending coordinates. For example, as shown in FIG. 13(a), the selected region 60 can be specified by setting up starting coordinate Vs and ending coordinate Ve in the vertical scanning direction V, as well as setting up starting coordinate Hs and ending coordinate He in the horizontal scanning direction H on the image frame 60.

Figure 13A:
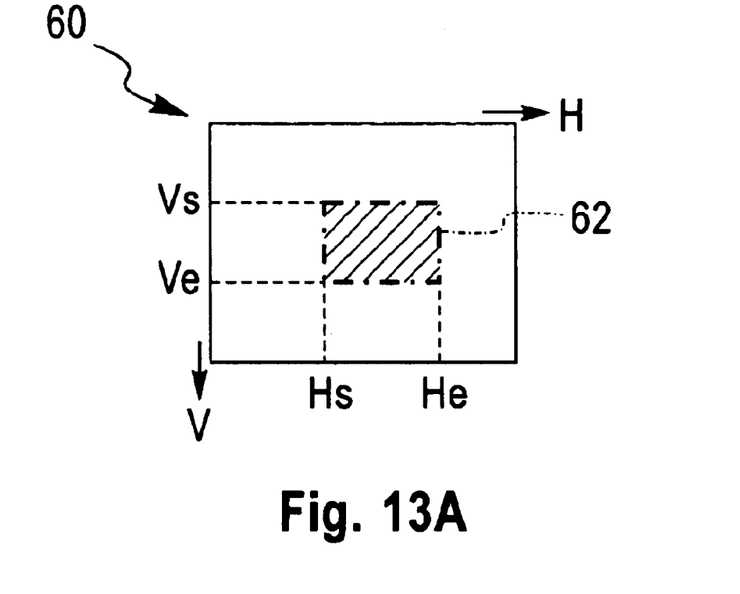
FIG. 13(a) shows an example of definition of a selected region by coordinates.
Figure 14:
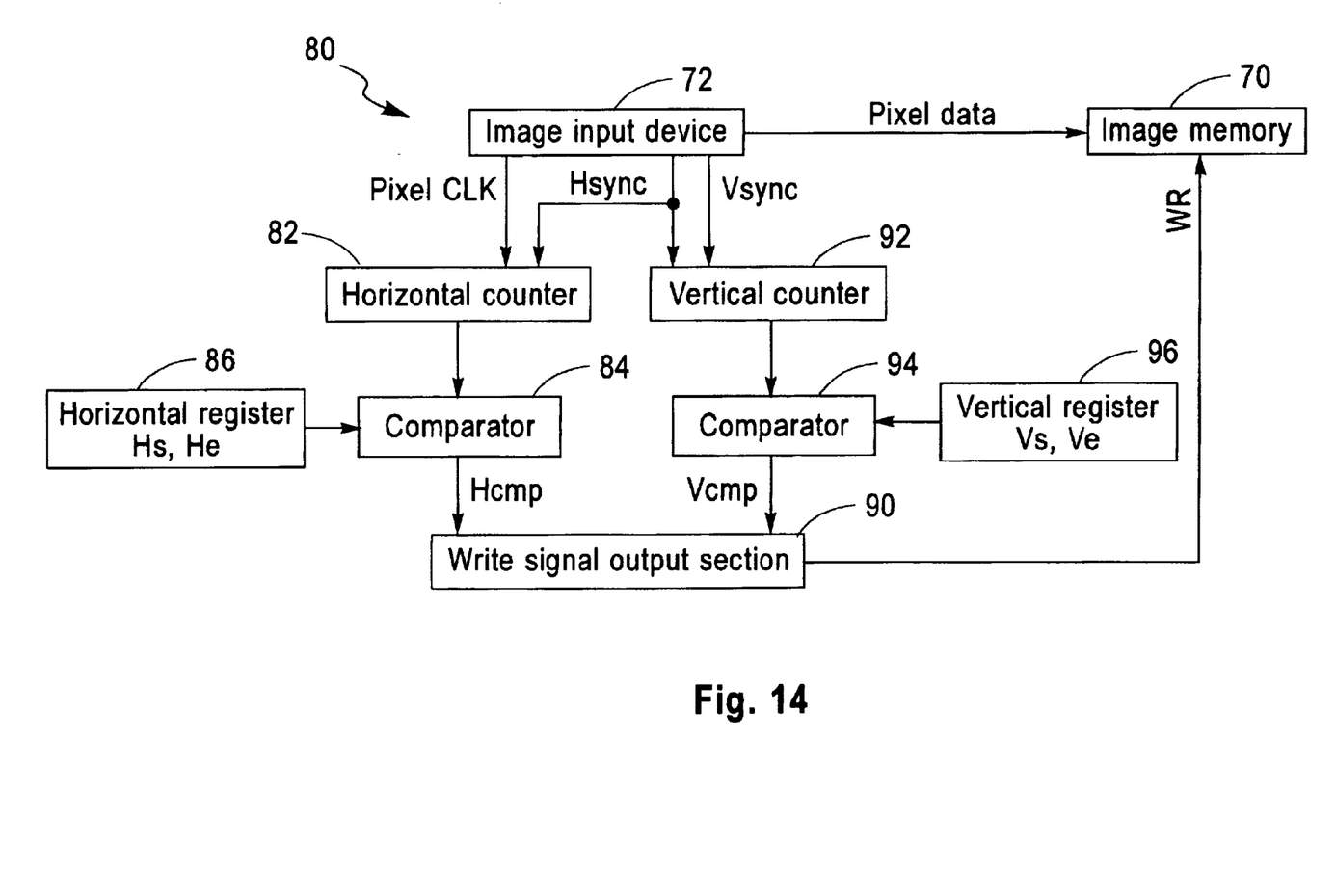
FIG. 14 shows the other example of the input image processing apparatus in the prior art.

A typical method of fetching the pixel data included within the selected region 62 shown in FIG. 13(a) from the image frame 60 inputted from the image input device 72 is to determine the coordinates on the image frame 60 of the pixel data currently inputted and indicate write of the pixel data into another image memory only in the case these coordinates are included in the selected region 62. An example of an input image processing apparatus 80 for performing this method is illustrated in FIG. 14.

The coordinates on the image frame 60 in the pixel data currently inputted can be determined by a horizontal counter 82 and a vertical counter 92. Pixel CLK is an input synchronizing signal, Hsync is a horizontal synchronizing signal and Vsync is a vertical synchronizing signal. The horizontal counter 82 counts the pixel CLK to determine the coordinate h in the horizontal scanning direction H. When the Hsync is inputted, the horizontal counter 82 will be reset. The vertical counter 92 counts the Hsync to determine the coordinate v in the vertical scanning direction V. When the Vsync is inputted, the vertical counter 92 will be reset.

Horizontal direction components Hs and He of the starting and ending coordinates to determine the selected region 62 are stored in a horizontal register 86, and vertical direction components Vs and Ve of the starting and ending coordinates to determine the selected region 62 are stored in a vertical register 96. A comparison is made between the count value Vc of the vertical counter 92 and the values Vs and Ve of the vertical register 96 using a comparator 94, as well as making a comparison between the count value Hc of the horizontal register 82 and the values Hs and He of the horizontal register 86 using the comparator 84. A signal Hcmp indicating whether or not it satisfies Hs≦Hc≦He is sent to a write signal output section 90, and a signal Vcmp indicating whether or not the comparator 94 satisfies Vs≦Vc≦Ve is sent to the write signal output section 90.

Figure 13B:
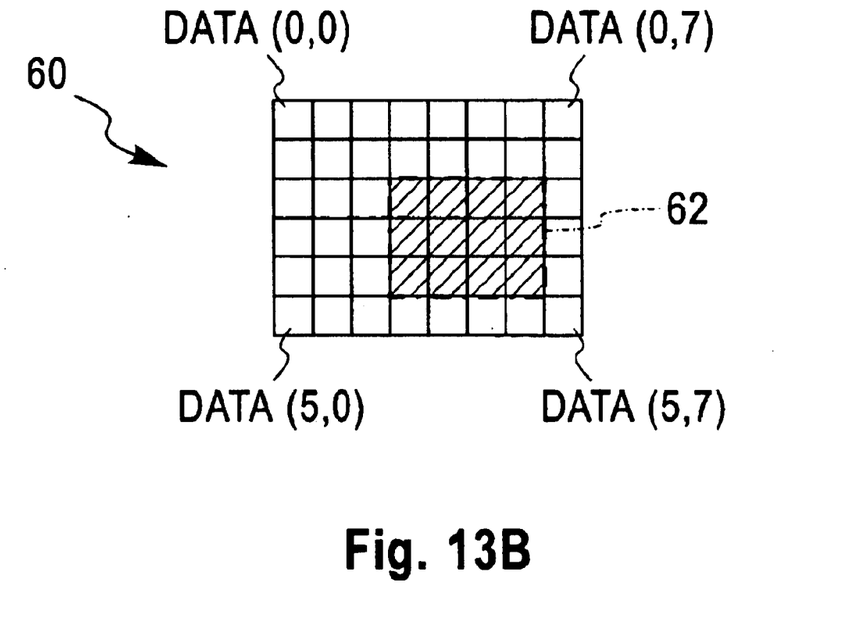
FIG. 13(b) illustrates an example of the selected pixels.
Figure 15:
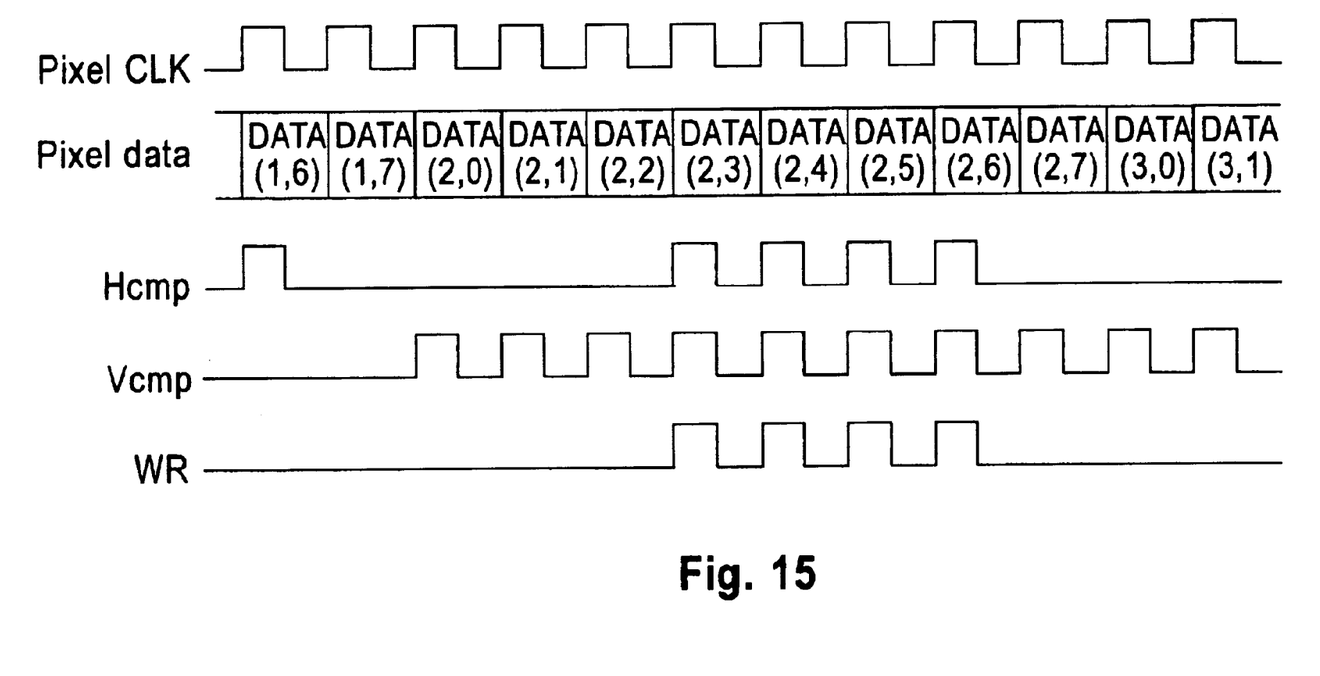
FIG. 15 is a timing chart showing an example of the write of the pixel data into the image memory using the input image processing apparatus shown in FIG. 14.

When the values are Hs≦Hc≦He and Vs≦Vc≦Ve, the write signal output section 90 instructs an image memory 70 to write the pixel data because the pixel data (DATA (Hc, Vc)) currently inputted is included in the selected region 62. A timing chart of image processing for the pixel data from DATA (1, 6) to DATA (3, 1) when the selected region 62 is defined by 4 points; DATA (2, 3), DATA (2, 6), DATA (4, 3), and DATA (4, 6) as shown in FIG. 13(b) is shown in FIG. 15.

The method for fetching the image data 64 from the selected region 62 under the control of the MPU 74 as shown in FIG. 12 requires two image memories. Further, the necessity for the MPU 74 to once store the image frame 60 in the image memory A and perform software processing increases the load on the MPU 74, which may lead to inability to process a large amount of image data consecutively. In the method of defining the selected region 62 using the starting and ending coordinates as shown in FIG. 13(a), only the rectangle-type selected region 62 can be defined.

It is an object of the present invention to consecutively store in an image memory image data within a selected region of an arbitrary shape provided on an image frame.

SUMMARY OF THE INVENTION

The input image processing apparatus of the present invention comprises a region selection memory for storing region selection information for defining a selected region in input image frame, and write indication means for indicating write of pixel data included in the selected region into an image memory based on the region selection information. This image processing apparatus reads the region selection information from the region selection memory. And then the apparatus determines based on the region selection information whether or not the inputted pixel data is included in the selected region, and indicates the write of the pixel data included in the selected region into the image memory.

The image processing method of the present invention includes the steps of determining whether or not input pixel data is included in a selected region in input image frame, and writing the pixel data included in the selected region into an image memory.

According to the input image processing apparatus and the processing method of the present invention, pixel data within a selected region defined on an image frame can be consecutively stored in an image memory. When the image frame is composed of a plurality of subframes, inputted by a plurality of image input devices, the pixel data within a selected region defined on the image frame can be successively stored in the image memory as well.

REFERENCE CHARACTERS OF THE DRAWINGS 10, 12, 20: Input image processing apparatus
14: FIFO memory
16: FIFO control section
18: Pixel selection information
22: Multiplexer
32, 34, 60: Image frame
62: Selected region
64: Image data included in the selected region
68, 80: Input image processing apparatus (prior art)
70: Image memory
72: Image input device
74: MPU (Microprocessor)

DESCRIPTION OF THE PREFERRED EMBODIMENTS

Next, a preferred embodiment of an input image processing apparatus and a processing method according to the present invention will be described in detail with reference to the accompanying drawings.

Figure 1A:
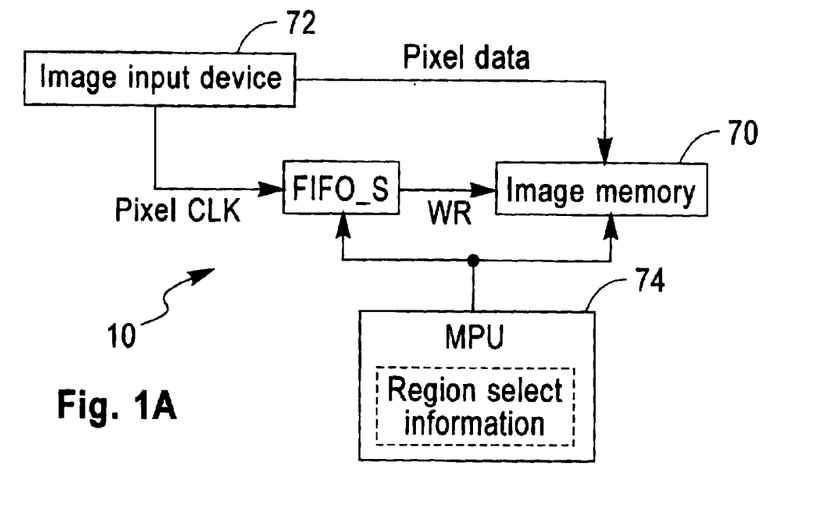
FIG. 1(a) is a block diagram showing an example of an input image processing apparatus according to the present invention.

FIG. 1(a) shows an example of an input image processing apparatus 10 according to the present invention. The input image processing apparatus 10 includes a memory (FIFO-S) which stores region selection information for specifying a selected region within inputted image data and outputs a signal WR for indicating write of pixel data included in the selected region to an image memory 70 based on the region selection information. A FIFO (First-In First-Out) memory is used for the control memory in the embodiments of the present invention. A pixel CLK signal for indicating data inputting of the pixel data from an image input device 72 is inputted to FIFO-S. FIFO-S outputs the write signal WR for indicating the writing of the pixel data into the image memory 70.

Figure 2A:
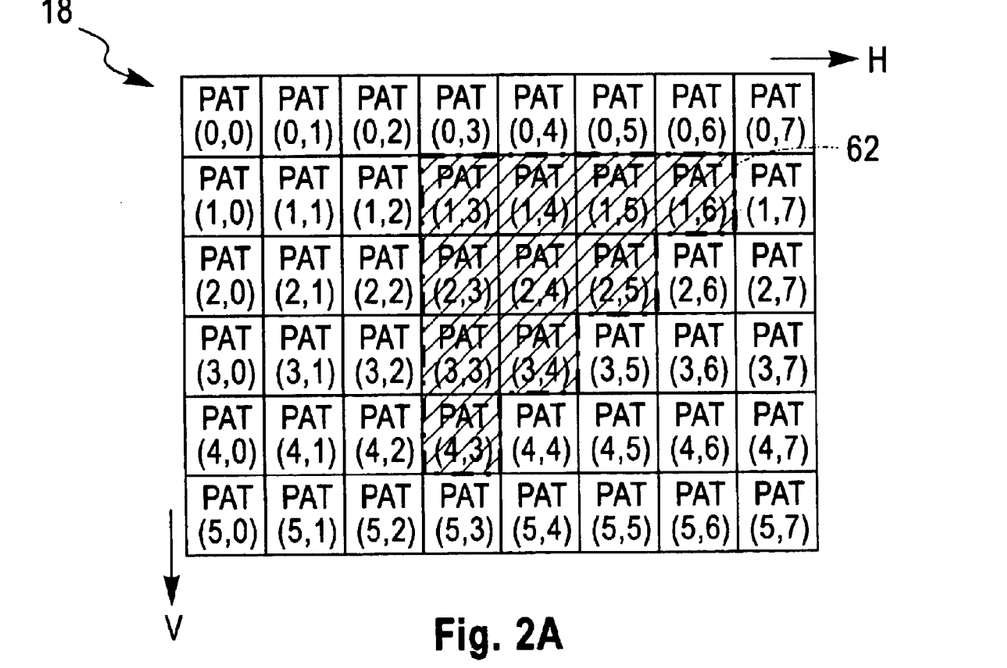
FIG. 2(a) shows a selected region of an image frame shown in FIG. 11.
Figure 2B:
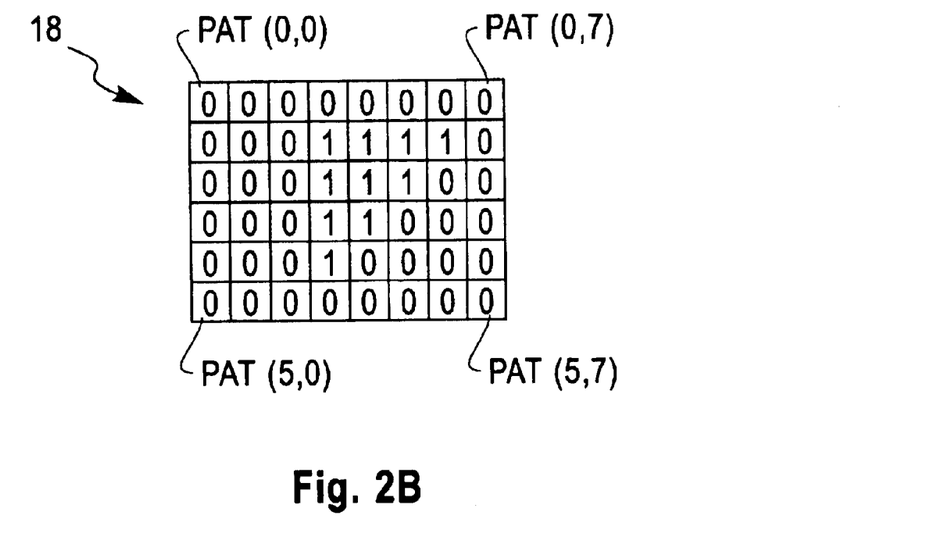
FIG. 2(b) shows pixel selection information.
Figure 3:
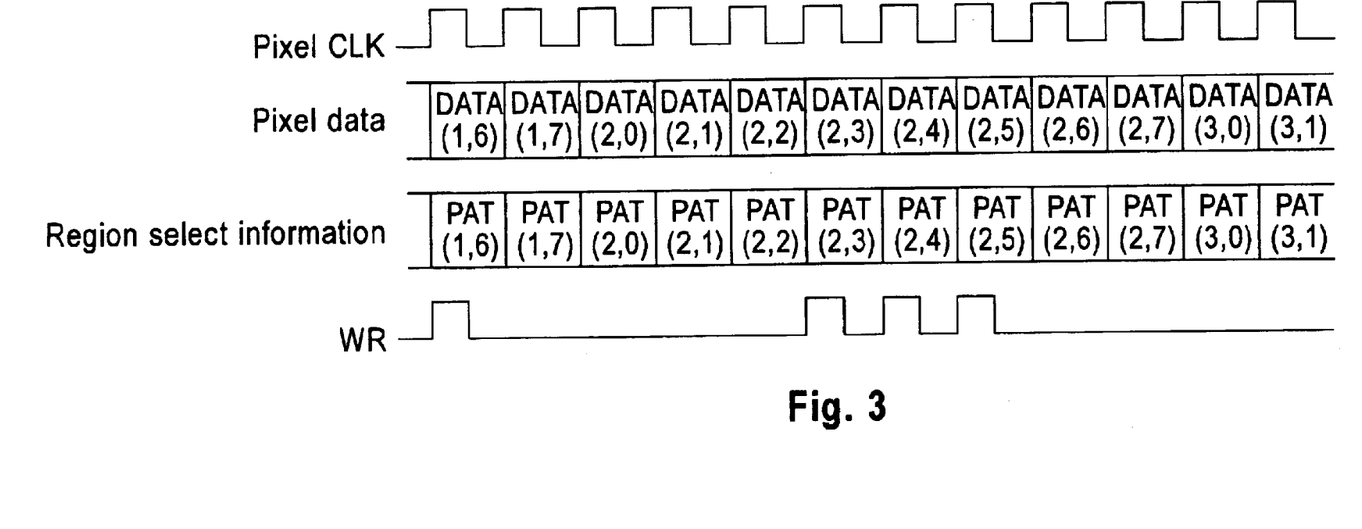
FIG. 3 is a timing chart showing an example of write of pixel data using the input image processing apparatus shown in FIG. 1.

The region selection information comprises pixel selection information indicating whether or not each pixel of an image frame 60 is included in a selected region 62 within the image frame 60. For instance, when a triangular selected region 62 shown in FIG. 2(b) is defined in the image frame 60 of 8 pixels wide by 6 pixel high as aforementioned with reference to FIG. 11, pixel selection information 18 as shown in FIG. 2(b) is used, which indicates whether each pixel of the image frame 60 is included in the selected region 62 (1) or not (0). A MPU 74 writes the region selection information into FIFO-S.

FIFO-S outputs the pixel selection information as the signal WR in synchronism with the data inputting of the pixel data (pixel CLK). When the pixel selection information is 1, which means that an associated pixel is included in the selected region 62, the image memory 70 writes the pixel data. The image memory 70 does not write the image data when the pixel selection information is 0 which means that an associated pixel is not included in the selected region 62.

Figure 1B:
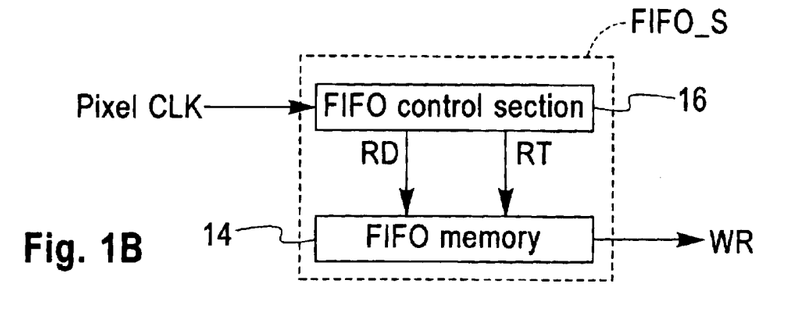
FIG. 1(b) is a block diagram showing details of FIFO-S shown in FIG. 1(a).

When the selected region 62 remains unchanged, the same pixel selection information 18 is repeatedly outputted from FIFO-S. As shown in FIG. 1(b), FIFO-S comprises a FIFO memory 14 and a FIFO control section 16. The same pixel selection information 18 can be repeatedly outputted by controlling the addressing of the FIFO memory 14 by the FIFO control section 16.

The MPU 74 stores the pixel selection information 18 in the FIFO memory 14. When the pixel CLK is inputted to the FIFO control section 16, the FIFO control section 16 sends a signal RD to the FIFO memory 14 to indicate readout of data from the FIFO memory 14. The pixel selection information is read from the FIFO memory 14 in synchronism with the pixel CLK.

When the pixel data for one image frame is outputted, the FIFO control section 16 sends a signal RT to the FIFO memory 14 for resetting the read address of the FIFO memory 14 to the first address. As the signal RT, a signal indicating that the pixel selection information 18 outputted from the FIFO memory 14 reaches the last position of the image frame or a vertical synchronizing signal Vsync of the image input device may be employed.

Now, the writing operation of the pixel data into the image memory 70 using the input image processing apparatus and the processing method will be described.

The MPU 74 writes the pixel selection information into FIFO-S. When pixel data is inputted, the pixel selection information corresponding to the pixel data is outputted from FIFO-S to the image memory 70 in synchronism with the data inputting of the pixel data. The operation will now be explained by taking as an example the case where the pixel data of DATA (1, 6) through DATA (3, 1) of the image frame 60 shown in FIG. 11 are inputted.

This pixel selection information (0 or 1) acts as the signal WR to indicate the write of the inputted pixel data. In this example, PAT (1, 6), PAT (2, 3), PAT (2, 4), and PAT (2, 5) respectively output 1 because DATA (1, 6), DATA (2, 3), DATA (2, 4), and DATA (2, 5) are included in the selected region 62. Accordingly, write is indicated only when DATA (1, 6), DATA (2, 3), DATA (2, 4), and DATA (2, 5) included in the selected region 62 among DATA (1, 6) through DATA (3, 1) are inputted to store only DATA (1, 6), DATA (2, 3), DATA (2, 4), and DATA (2, 5) in the image memory 70.

As described above, with the use of the input image processing apparatus 10 of the present invention, the region selection information stored in FIFO-S can be used as a write indication signal for the pixel data. Only the pixel data included in the selected region 62, defined on the image frame 60, is written consecutively into the memory 70 for image processing by the MPU 74. Any pixels of the image frame 60 can be specified by the pixel selection information.

Figure 1C:
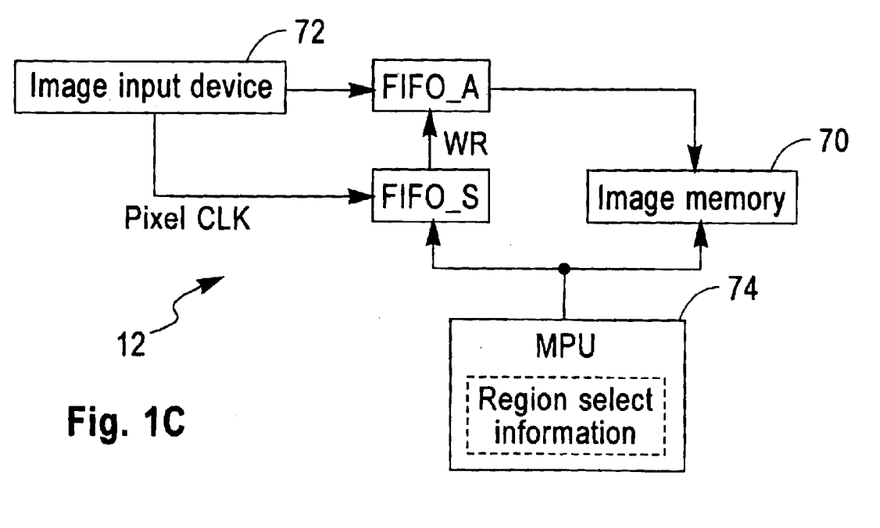
FIG. 1(c) shows another example of the input image processing apparatus equipped with FIFO-A between the image input device shown in FIG. 1(a) and an image memory.
Figure 4:
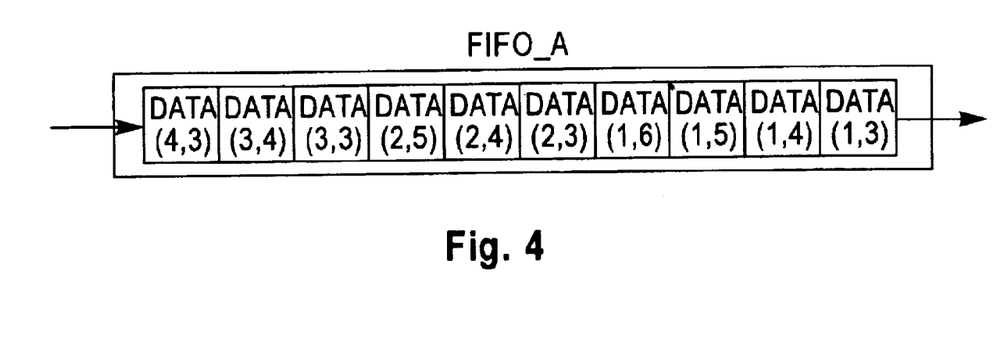
FIG. 4 shows an example of the pixel data stored in FIFO-A of the input image processing apparatus shown in FIG. 1(c).

As shown in FIG. 1(c), a FIFO memory (FIFO-A) may be placed between the image input device 72 and the image memory 70. The write signal WR outputted from FIFO-S is inputted to FIFO-A so that only the pixel data included in the selected region 62 is, as shown in FIG. 4, stored once in FIFO-A before the pixel data is stored in the image memory 70.

Figure 5A:
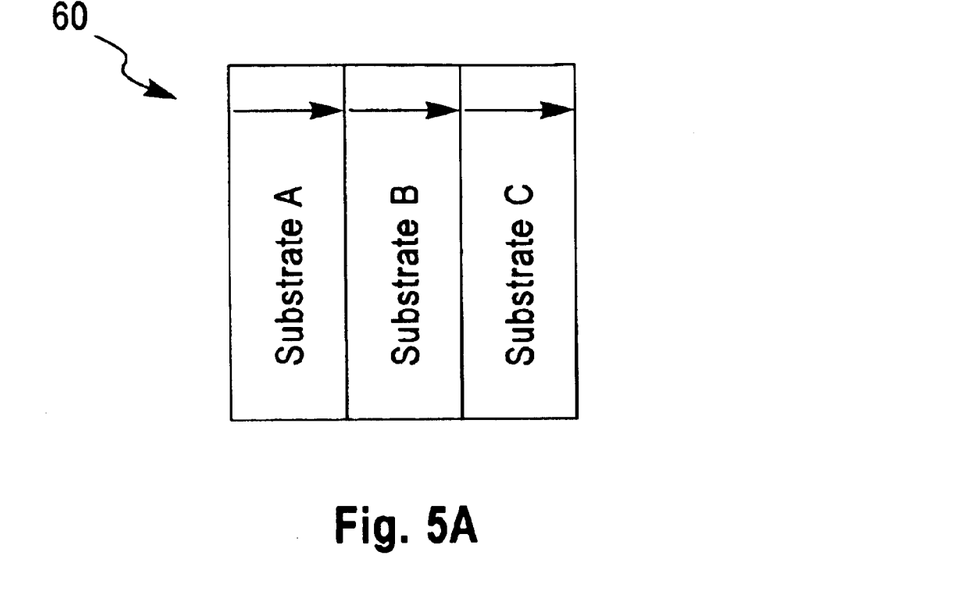
FIG. 5(a) shows an example of an image frame divided into subframes.
Figure 6:
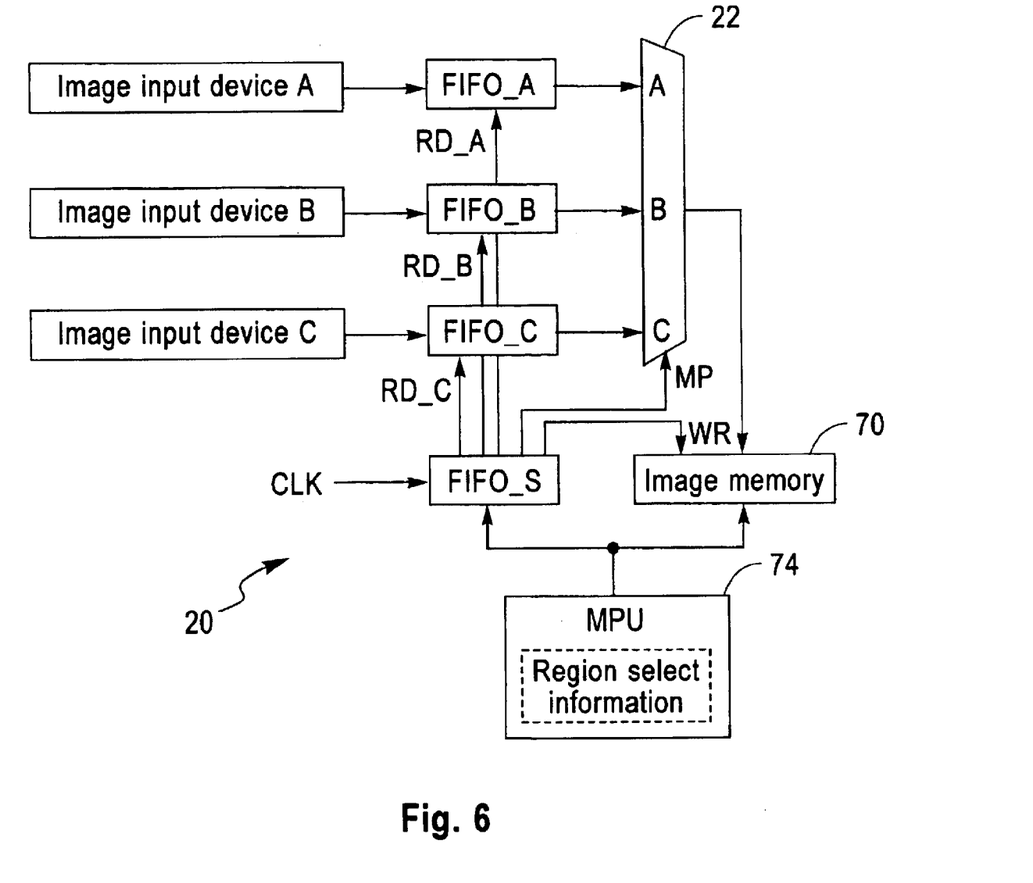
FIG. 6 shows still another example of the input image processing apparatus.

In the above, the case of inputting the image frame 60 from one input device 72 has been described as an example, but there may also be a case where one image frame is composed of subframes respectively inputted from a plurality of image input devices. For example, as shown in FIG. 5(a), the image frame 60 may be composed of three subframes A, B, and C. An example of an input image processing apparatus 20 where such plural number of subframes are inputted is shown in FIG. 6.

The input image processing apparatus 20 comprises subframe memories (FIFO-A, FIFO-B, and FIFO-C) in which pixel data of subframes A, B, and C is respectively stored, a multiplexer 22 for selecting an output signal of any one of FIFO-A, FIFO-B, and FIFO-C and sending it to an image memory 70, and a control memory (FIFO-S) which stores region selection information defining a selected region 62. The FIFO-S operates to provide signals RD-A, RD-B, RD-C, MP and WR based on the area selection information. In the embodiment, FIFO memories are used for the control and the subframe memories.

The signal RD-A indicates readout of the pixel data from FIFO-A. RD-B and RD-C indicate readout of the pixel data from FIFO-B and FIFO-C. The signal MP is used to select an output of the multiplexer 22 so that the pixel data from one of FIFO-A, FIFO-B, and FIFO-C is sent to the image memory 70. The signal WR indicates write into the image memory 70.

The region selection information is stored in FIFO-S. The region selection information includes pixel selection information for indicating whether each pixel of the image frame 60 is included (1) in the selected region 62 or not (0), and subframe information for indicating which subframe (A, B, or C) each pixel of the image frame 60 belongs to. The MPU 74 writes the region selection information in the control memory FIFO-S.

The pixel data inputted from each of the image input devices A, B, and C is stored in each of the subframe memories (FIFO-A, FIFO-B, and FIFO-C). If one of FIFO-A, FIFO-B, and FIFO-C is specified by the read signal RD-A, RD-B, or RD-C, the pixel data will be outputted from the subframe memory specified.

The multiplexer 22 selects the output of any one of FIFO-A, FIFO-B, and FIFO-C to send it to the image memory 70. The signal MP specifies the selection of data outputting. For example, when MP is 00, FIFO-A is selected. When the signal is 01, FIFO-B is selected, and FIFO-C is selected when the signal is 10.

Figure 7:
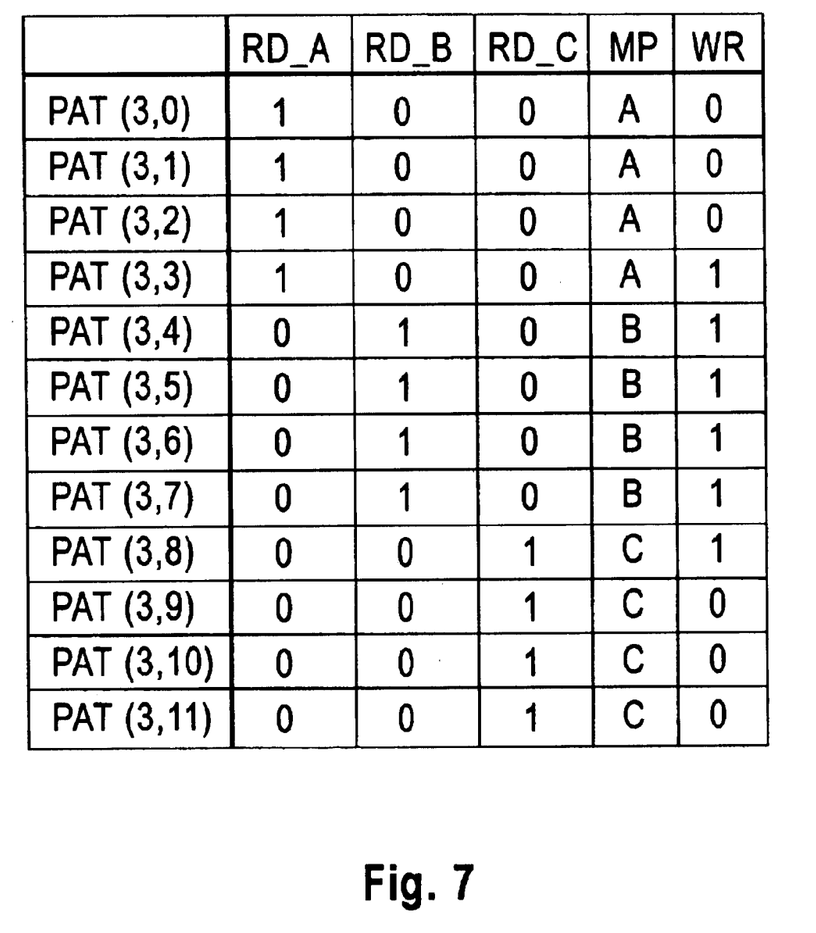
FIG. 7 shows a part of region selection information for the image frame shown in FIG. 5(b).

FIG. 7 illustrates the region selection information for DATA (3, 0) through DATA (3, 11) in the case where a triangular selected region 62 is defined on the image frame 60 of 12 pixels wide by 9 pixels high which is composed of three subframes A, B, and C of 4 pixels wide by 9 pixels high as shown in FIG. 5. The region selection information in FIG. 7 includes, for each of pixels, data for read signals RD-A, RD-B, and RD-C applied to the subframe memories (FIFO-A, FIFO-B, and FIFO-C), the selection signal MP, and the write signal WR applied to the image memory 70. The signal data RD-A, RD-B, RD-C and MP provide the subframe information and the signal data WR acts as the pixel selection information.

A synchronizing CLK having a frequency three times as high as the pixel CLK is inputted to FIFO-S. The pixel data is inputted from each of the image input devices to each of the subframe memories during one pixel CLK. The region selection information for three pixels is read from FIFO-S in three synchronizing CLK cycles. The signals RD-A, RD-B, and RD-C are respectively sent to the subframe memories A, B, and C. The signal MP is sent to the multiplexer 22, and the write signal WR is sent to the image memory 70.

If the selected region is unchanged, the same region selection information can be outputted repeatedly as mentioned above in connection with FIG. 1(c).

Now, an explanation will be given to the writing operation of the pixel data into the image memory 70 using such input image processing apparatus and processing method.

Figure 5B:
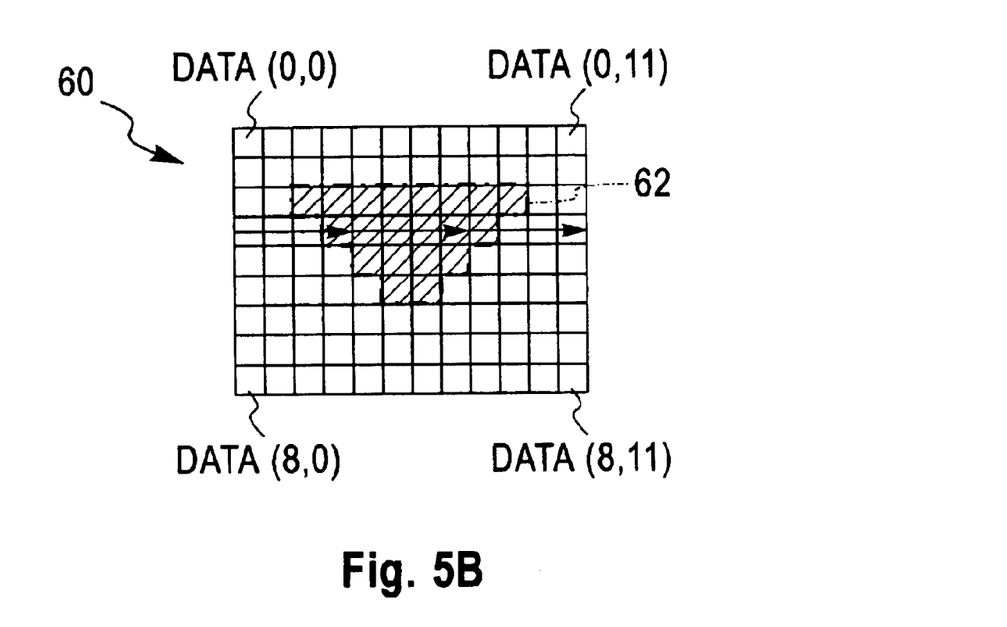
FIG. 5(b) shows an example of a selected region defined on the image frame.

When the pixel data is inputted, the region selection information corresponding to the pixel data is read from FIFO-S. In the explanation of the present invention, three pixel data is inputted at one time to read the data in the order of the subframes A, B, and C. For example, explaining the pixel data of DATA (3, 0) through DATA (3, 11) shown in FIG. 5 (b) as an example, DATA (3, 0), DATA (3, 4), and DATA (3, 8) are inputted to FIFO-A, FIFO-B, and FIFO-C respectively in one pixel CLK.

First, region selection information PAT (3, 0) corresponding to DATA (3, 0) is read to read DATA (3, 0) from the subframe memory A. Since DATA (3, 0) is not included in the selected region 62, no instructions for write are given. Secondly, the region selection information PAT (3, 4) corresponding to DATA (3, 4) is read to read DATA (3, 4) from the subframe memory B. Since DATA (3, 4) is included in the selected region, indications for write into the image memory 70 are given. Third, the region selection information PAT (3, 8) corresponding to DATA (3, 8) is read to read DATA (3, 8) from the subframe memory C. Since DATA (3, 4) is included in the selected region as well, indications for the write into the image memory 70 are given. DATA (3, 4) and DATA (3, 8) are stored in the memory 70.

DATA (3, 1), DATA (3,5), and DATA (3, 9) are processed in similar manners. When DATA (3, 2), DATA (3, 6), DATA (3, 10), and DATA (3, 3), DATA (3, 7) and DATA (3, 11) are processed similarly, DATA (3, 4), DATA (3, 8), DATA (3, 5) and DATA (3, 6), DATA (3, 3), and DATA (3, 7) included in the selected region 62 are stored in the image memory 70. The timing chart at this time is shown in FIG. 8.

Thus, the region selection information of FIFO-S can be used as a control signal to output the pixel data of FIFO-A, FIFO-B, and FIFO-C and write them into the image memory 70 by using the image processing apparatus 20 of the present invention. The pixel data within the selected region 62 given on the image frame 60 comprising a plurality of subframes is consecutively stored in the image memory 70, so that the MPU 74 can perform operations.

Figure 8:
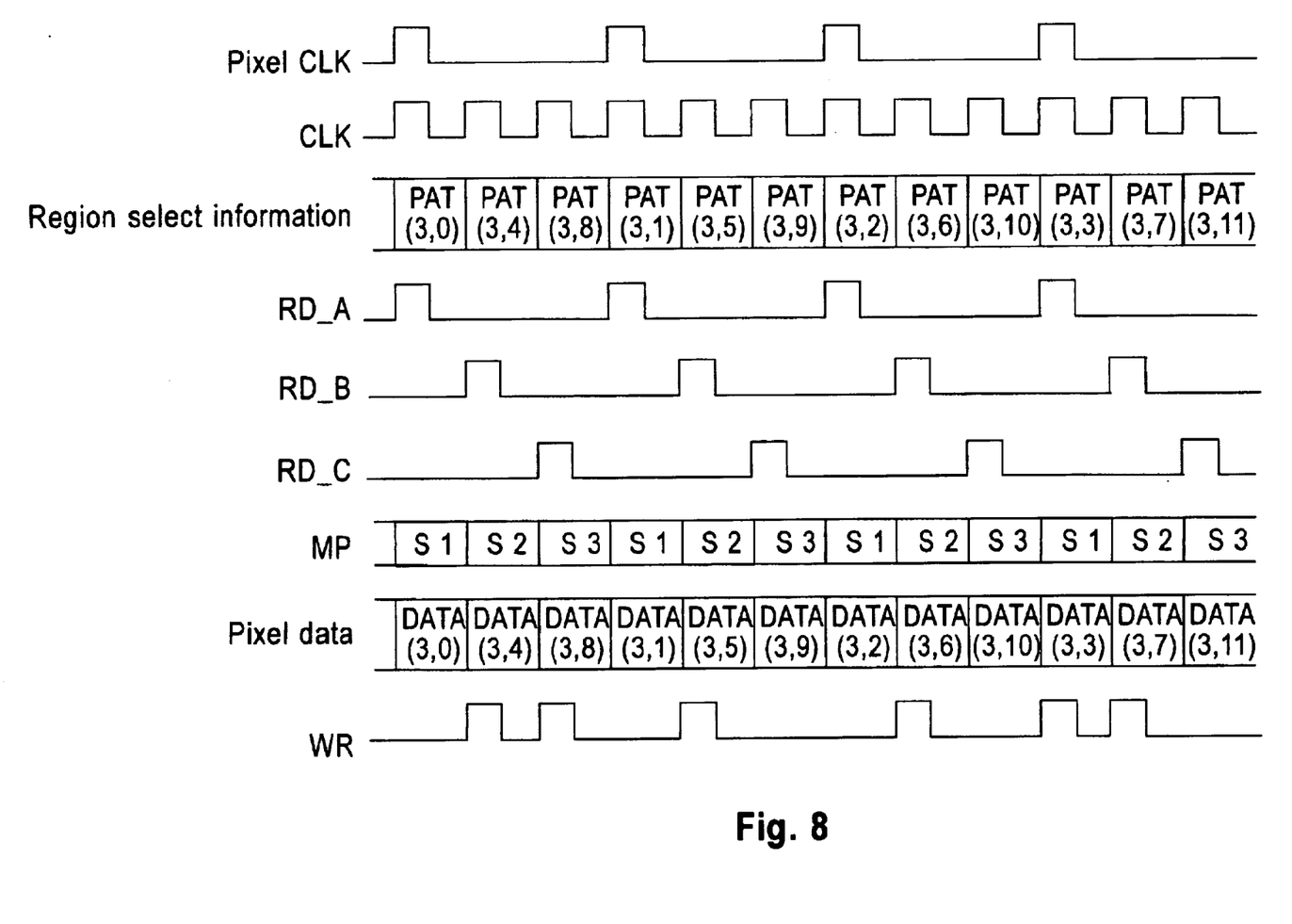
FIG. 8 is a timing chart showing an example of the write of the pixel data into the image memory using the input image processing apparatus shown in FIG. 6.

In FIG. 8, the order of the write into the image memory 70 is not sequential due to the readout of the pixel data in the order of the input to the subframe memories. The order of write of the pixel data can be controlled by the order of readout of the region selection information. Specifically, it can be controlled by changing the order of write of the region selection information into FIFO-S. The MPU 74 can control the write of the region selection information into this FIFO-S.

Figure 9:
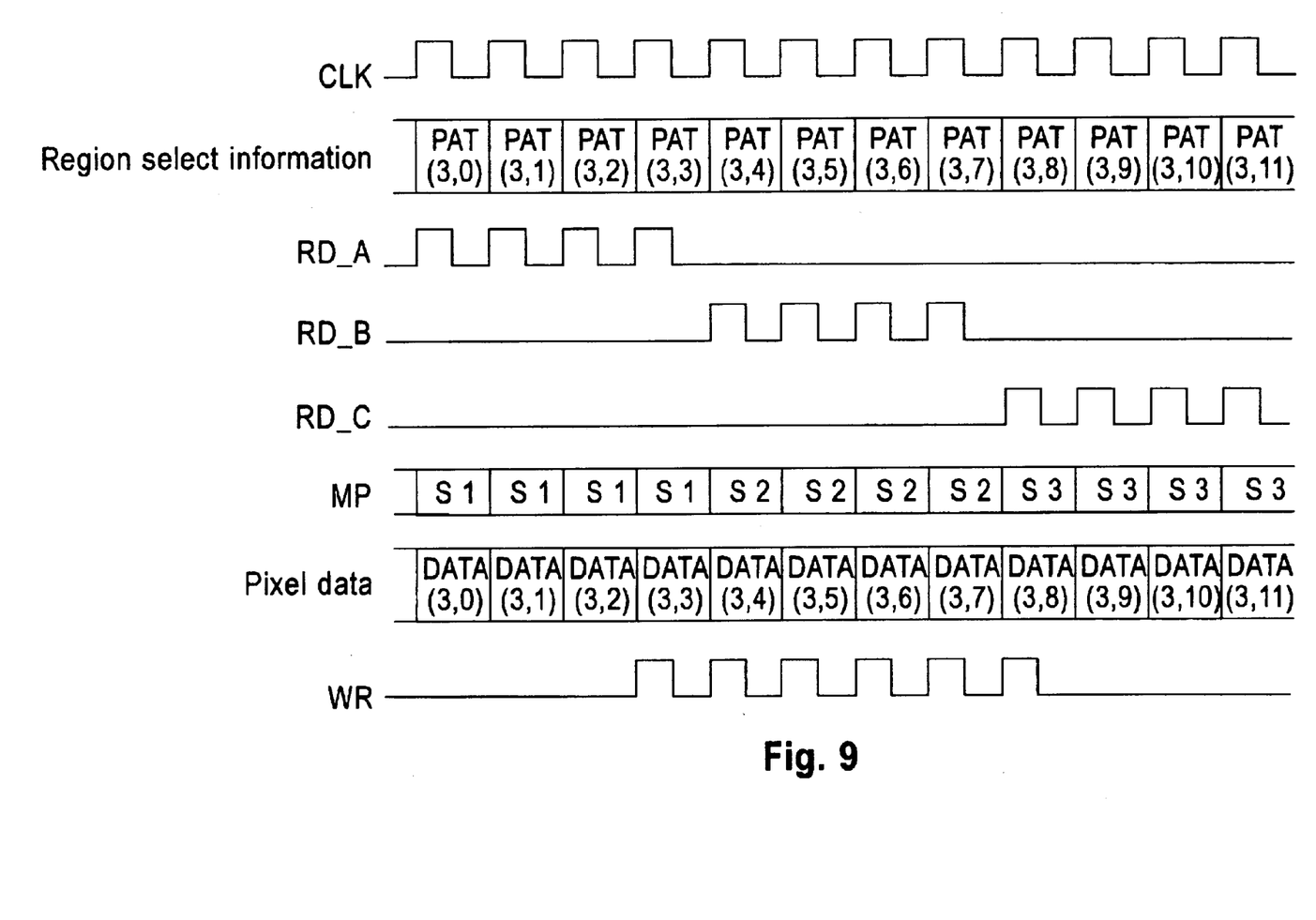
FIG. 9 is a timing chart showing another example of the write of the pixel data into the image memory using the input image processing apparatus shown in FIG. 6.
Figure 10:
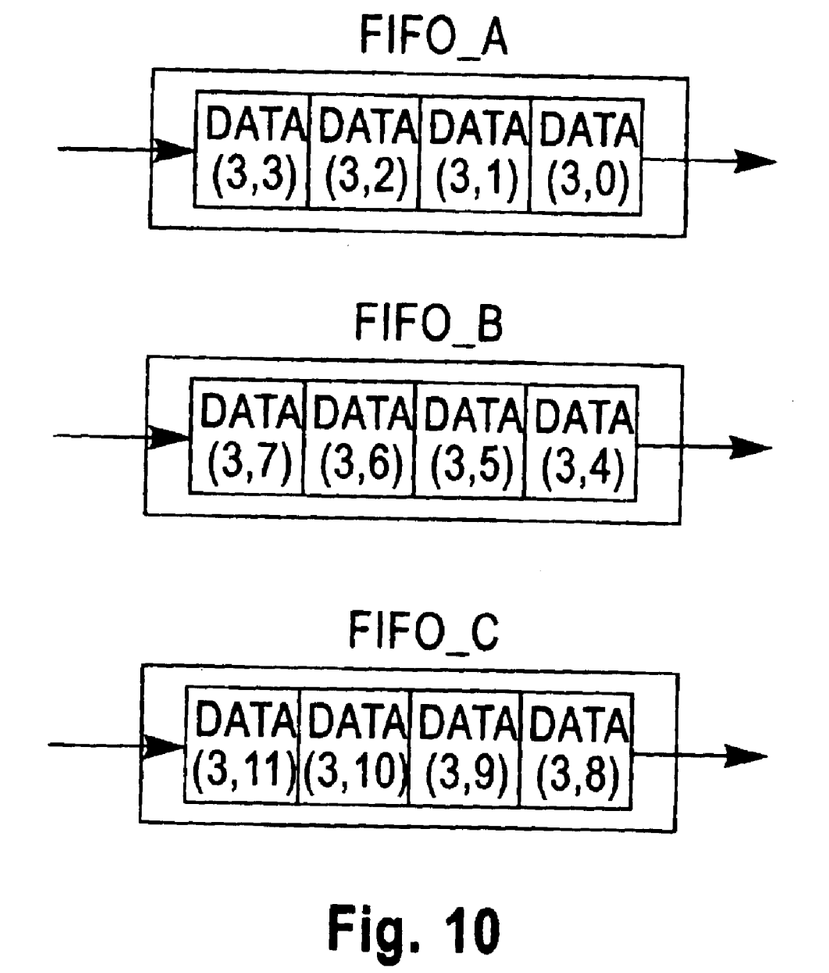
FIG. 10 shows an example of pixel data stored in the memories.

The pixel data may be read from each of the subframe memories in order, as shown in FIG. 9, by the change of the order of write of the region selection information into FIFO-S. The pixel data is stored in each of the subframe memories as shown in FIG. 10, and then FIFO-S reads the region selection information so that the pixel data in the subframe memories is read in the order in which pixels are arranged in the image frame.

Particular embodiments of the present invention have been described so far, but the present invention may be attained by the other embodiments.

Also, any modification, variations or equivalent arrangements which may occur to those skilled in the art should be considered to be within the scope of the invention.

There have thus been shown and described Input Image Processing Apparatus and Processing Method therefor which fulfill all the objects and advantages sought therefor. Many changes, modifications, variations and other uses and applications of the subject invention will, however, become apparent to those skilled in the art after considering this specification and accompanying drawings which disclose the preferred embodiments thereof. All changes, modifications, variations and other uses and applications which do not depart from the spirit or scope of the present invention are deemed to be covered by the invention, which is to be limited only by the claims which follow.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An input image processing apparatus for storing in an image memory only pixel data included in a selected region defined in an image frame inputted from an image input device, comprising:

a region selection memory for storing region selection information for specifying the selected region in the image frame, wherein the information is consecutively stored in the image memory within the selected region of an arbitrary shape provided on the image frame; and write indication means for indicating write of the pixel data included in the selected region into the image memory based on the region selection information.

2. The input image processing apparatus according to claim 1, wherein said region selection information includes pixel selection information for indicating whether or not each pixel of the image frame is included in the selected region.

3. The input image processing apparatus according to claim 1, wherein said write indication means includes means for reading the pixel selection information from the region selection memory in synchronism with inputting of the pixel data and outputting the pixel selection information as a signal to indicate the write of the pixel data into the image memory.

4. An input image processing apparatus for storing in an image memory only pixel data included in a selected region defined in an image frame which is composed of subframes inputted from a plurality of image input devices, comprising:

region selection memory for storing region selection information for specifying the selected region in the image frame;

a plurality of subframe memories for storing the pixel data inputted from the image input devices respectively;

read specifying means for specifying the subframe memory from which the pixel data is to be read; and write indication means for indicating write of the pixel data included in the selected region into the image memory based on the region selection information.

5. The input image processing apparatus according to claim 4, wherein said region selection information includes:

pixel selection information for indicating whether or not each pixel data of the image frame is included in the selected region; and subframe information for indicating which subframe each pixel of the image frame belongs to.

6. The input image processing apparatus according to claim 5, wherein said read specifying means includes means for reading the subframe information from the region selection memory and outputting the subframe information to the subframe memories as a signal for specifying readout of the pixel data.

7. The input image processing apparatus according to claim 5, wherein said write indication means includes means for:

reading the pixel selection information from the region selection memory; and outputting the pixel selection information to the image memory as a signal for indicating write of the pixel data.

8. The input image processing apparatus according to claim 4, wherein the order of readout of the pixel data specified by said read specifying means is in the order of the inputting of the pixel data to the subframe memories.

9. The input image processing apparatus according to claim 4, wherein the order of readout of the pixel data specified by said read specifying means is in the order of arrangement of pixels within the image frame.

10. An input image processing method for storing pixel data alone included in a selected region defined in an image frame inputted from an image input device, including the steps of:

determining whether or not the inputted pixel data is included in the selected region, wherein the pixel data is consecutively stored in an image memory within the selected region of an arbitrary shape provided on the image frame; and writing the pixel data included in the selected region into the image memory.

11. The input image processing method according to claim 10, wherein said determining step includes reading pixel selection information from a region selection memory in synchronism with the inputting of the pixel data, said region selection memory storing the pixel selection information for indicating whether or not each pixel of the image frame is included in the selected region, and wherein said writing step includes outputting the read pixel selection information to the image memory as a signal for indicating write of the pixel data.

12. An input image processing method for storing pixel data alone included in a selected region defined in an image frame inputted from a plurality of image input devices, including the steps of:

storing the pixel data inputted from each of the image input devices in a corresponding subframe;

reading the pixel data from the subframe memories; and writing the pixel data included in the selected region among the pixel data read from the subframe memories into the image memory.

13. The input image processing method according to claim 12, wherein said reading step includes:

reading subframe information of the inputted pixels from a subframe information memory which stores the subframe information for indicating which subframe each pixel of the image frame belongs to; and outputting the read subframe information to the subframe memories as a signal for specifying the subframe memory to be read.

14. The input image processing method according to claim 12, wherein said writing step includes:

reading pixel selection information from a pixel selection information memory which stores pixel selection information for indicating whether or not each pixel of the image frame is respectively included in the selected region; and outputting the read pixel selection information to the image memory as a signal for indicating write of the pixel data.

15. The input image processing method according to claim 12, wherein said reading step reads the pixel data in the order of the inputting of the pixel data to the subframe memories.

16. The input image processing method according to claim 12, wherein said reading step reads the pixel data in the order of arrangement of the pixels in the image frame.

17. An article of manufacture comprising a computer usable medium having computer readable program code means embodied therein for causing storage of pixel data alone included in a selected region defined in an image frame inputted from an image input device, the computer readable program code means in said article of manufacture comprising computer readable program code means for causing a computer to effect the steps of claim 10.

18. An article of manufacture comprising a computer usable medium having computer readable program code means embodied therein for causing storage of pixel data alone included in a selected region defined in an image frame inputted from an image input device, the computer readable program code means in said article of manufacture comprising computer readable program code means for causing a computer to effect the steps of claim 11.

19. An article of manufacture comprising a computer usable medium having computer readable program code means embodied therein for causing storage of pixel data alone included in a selected region defined in an image frame inputted from a plurality of image input devices, the computer readable program code means in said article of manufacture comprising computer readable program code means for causing a computer to effect the steps of claim 12.

20. An article of manufacture comprising a computer usable medium having computer readable program code means embodied therein for causing storage of pixel data alone included in a selected region defined in an image frame inputted from a plurality of image input devices, the computer readable program code means in said article of manufacture comprising computer readable program code means for causing a computer to effect the steps of claim 14.

* * * * *